F. BOLDUAN & C. S. DYAS.
ANIMAL POISONING PRODUCT.
APPLICATION FILED OCT. 20, 1908.
962,886.
Patented June 28, 1910.
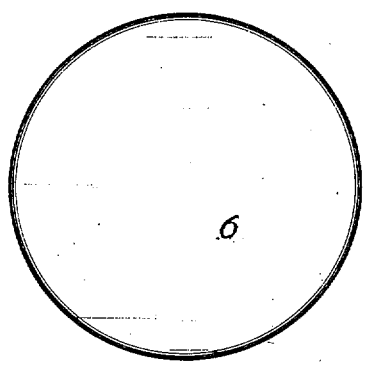
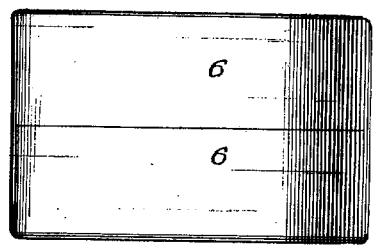
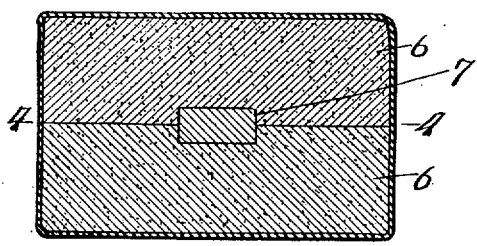
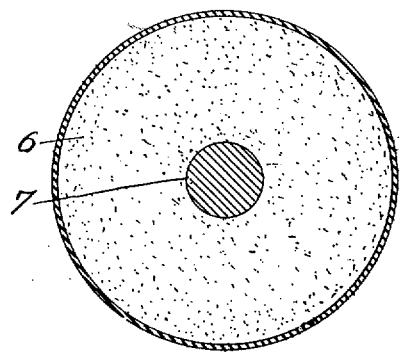
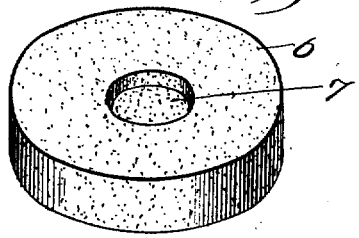

UNITED STATES PATENT OFFICE.

FRANK BOLDUAN AND CLAIR S. DYAS, OF CHICAGO, ILLINOIS; SAID DYAS ASSIGNOR TO SAID BOLDUAN.

ANIMAL-POISONING PRODUCT.

962,886.

Specification of Letters Patent.   Patented June 28, 1910.

Application filed October 20, 1908.   Serial No. 458,684.

*To all whom it may concern:*

Be it known that we, FRANK BOLDUAN and CLAIR S. DYAS, both citizens of the United States, residing at Chicago, in the county of Cook and State of Illinois, have invented certain new and useful Improvements in Animal-Poisoning Products, of which the following is a specification.

This invention relates to an improved animal poisoning product which is especially intended to be used in farming communities where coyotes, wolves, or other wild animals are found.

The object of the present invention is to make a poisonous animal food product from suitable animal matter formed into tablets or cakes which are adapted to receive and retain a poisonous substance, which is sealed within the tablets or cakes by stearin or any other adhesive substance, for sealing the tablets or cakes together.

In the drawings, Figure 1 is a top or plan view of the tablet or cake of the animal food poisoning product; Fig. 2 a side elevation thereof, the tablets or cakes being sealed together; Fig. 3 a vertical sectional elevation thereof; Fig. 4 a transverse section, taken on line 4—4 of Fig. 3; and Fig. 5 a perspective view of one of the tablets or cakes.

This improved animal food poisoning product comprises tablets or cakes 6, preferably of round formation, which may be made from granular blood, meat-meal, sugar, dried meat, fish or other animal matter, as desired. These tablets or cakes are preferably made of granular substance, and when pressed into proper shape, as indicated in Figs. 3, 4 and 5, have a portion of their bodies stamped out or recessed, as at 7, for the purpose of receiving and retaining therein a poisonous substance. After the poisonous substance is positioned within the recess 7 of the tablet or cake, another tablet or cake of similar formation is firmly sealed thereto, as indicated in Figs. 2 and 3, by dipping one or both of the recessed tablet faces in melted stearin or any other adhesive substance that will effectually seal the respective tablets or cakes together.

In the manufacture of this animal poisoning product it has been found that suitable granular substances, as granular blood, in combination with stearin, beef or mutton suet, can be readily compressed or molded into desired shape, the interior to be hollow and suitably recessed so that a poisonous tablet can be placed within this recess and then securely sealed with another substance that will readily absorb moisture of the gastric juice of the stomach when swallowed. This is for the purpose of killing coyotes, wolves, and other wild animals.

The tablets or cakes 6 of this improved animal food poisoning product, being preferably made of suitable granular animal matter, will readily attract carniverous animals, such as wolves and bears; and when these tablets have been swallowed by animals they will very quickly dissolve, thus enabling the poison to promptly take effect.

What we claim as new and desire to secure by Letters Patent is:

An animal poisoning product, comprising independent companion recessed cakes of a mixture of granular blood and mutton suet, the recessed cakes retaining and surrounding a poisonous tablet, and being sealed together by means of stearin, substantially as described.

FRANK BOLDUAN.
CLAIR S. DYAS.

Witnesses:
  WALKER BANNING,
  PIERSON W. BANNING.